(No Model.) 5 Sheets—Sheet 3.
R. GWINNER, J. KAUTSKY, C. DENGG & F. ROTH.
HYDRAULIC THEATER APPLIANCE.
No. 296,286. Patented Apr. 1, 1884.
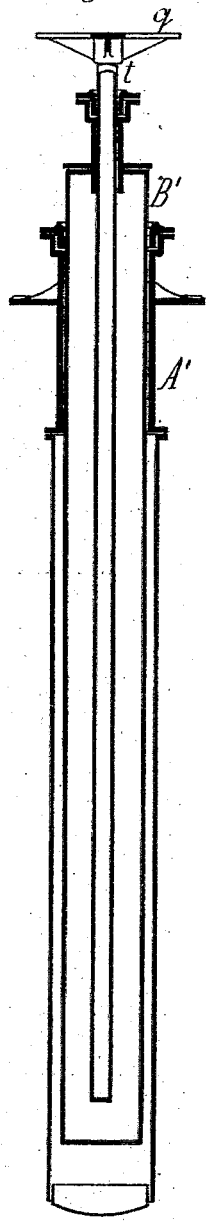
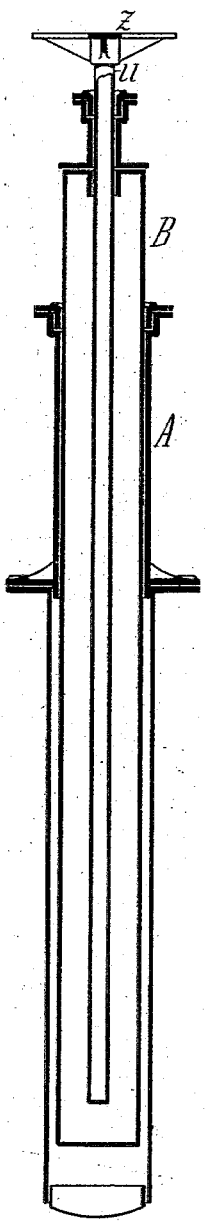
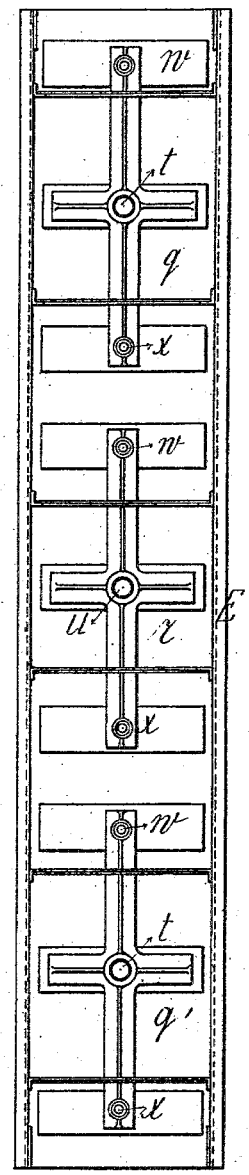

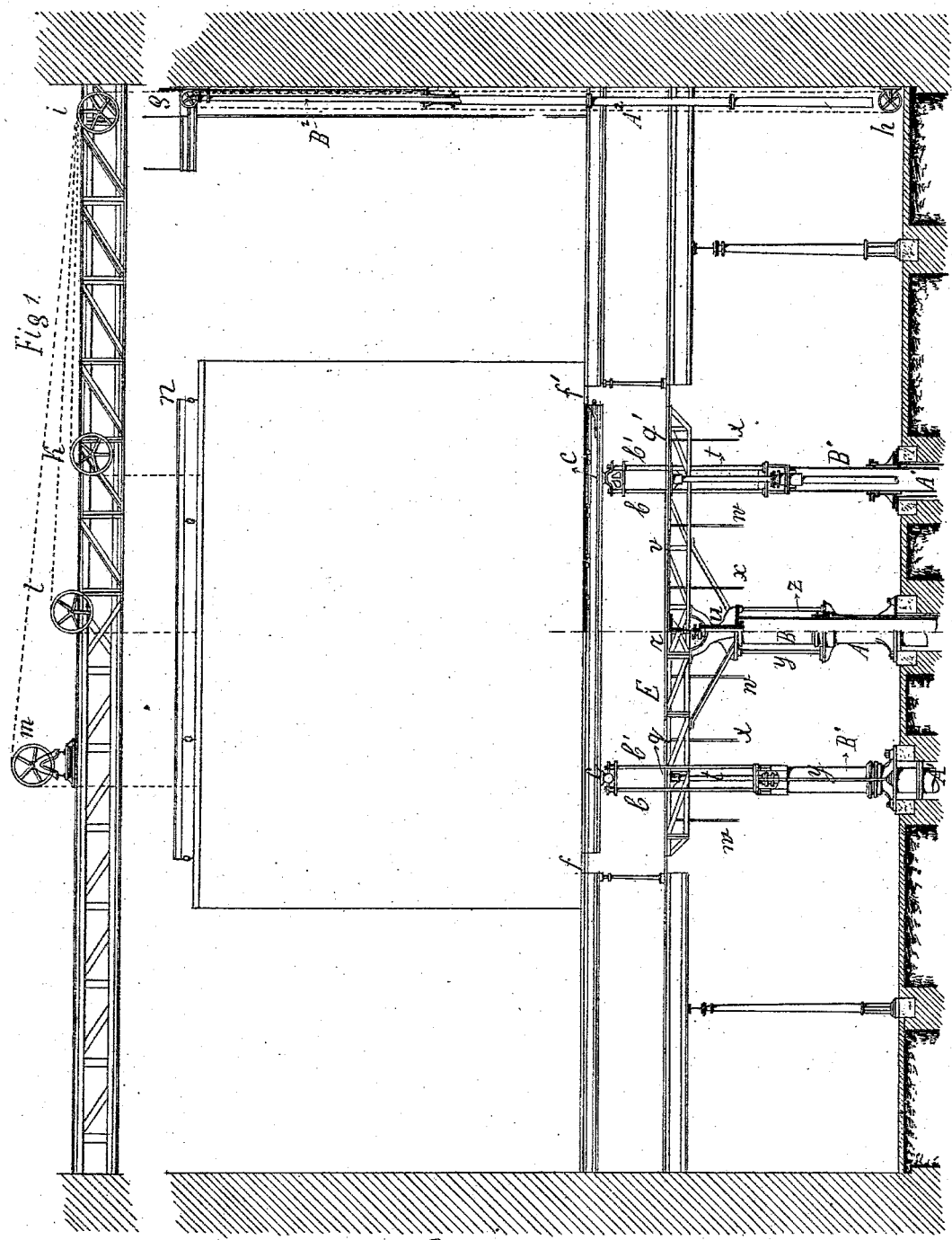

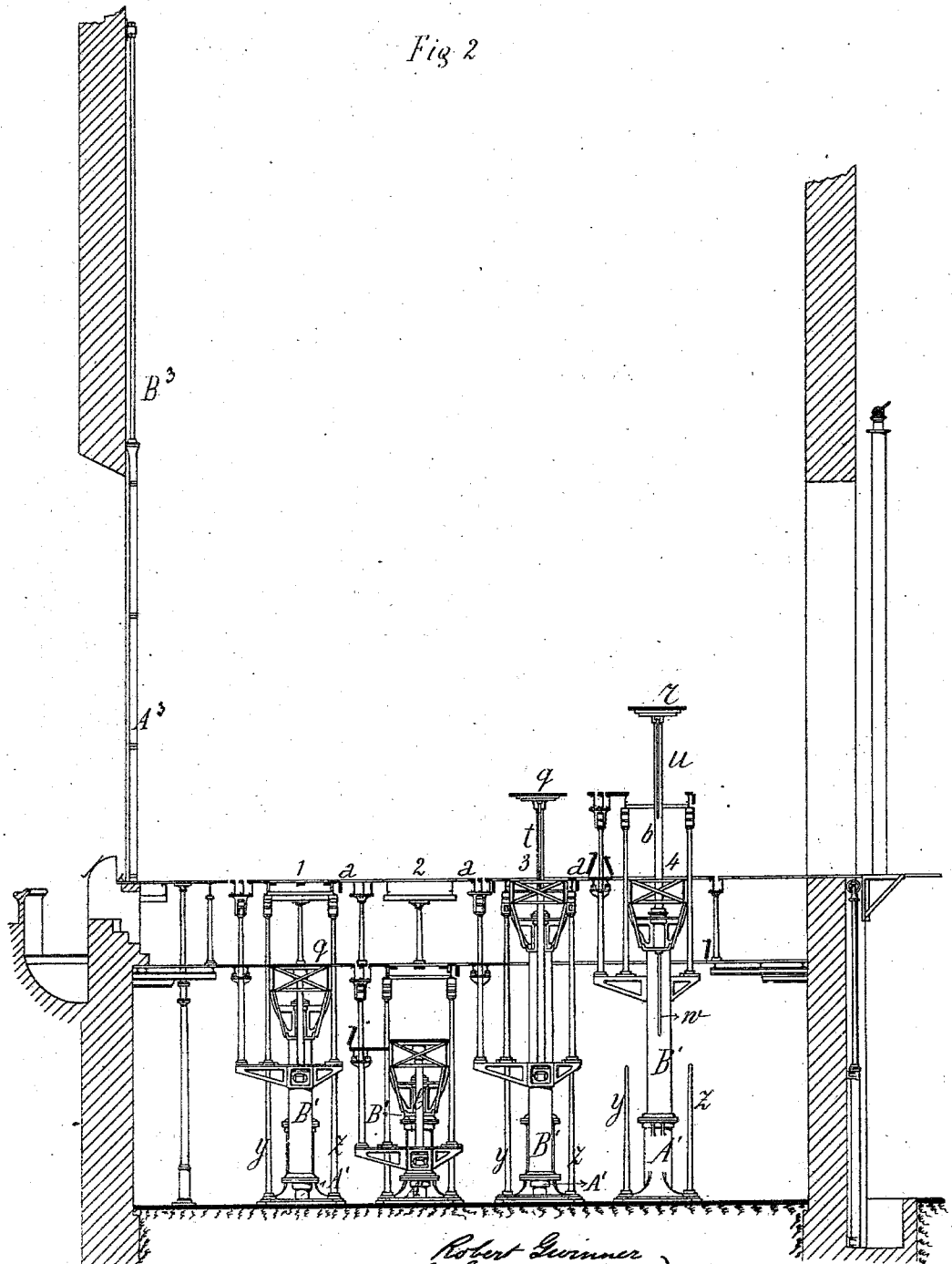

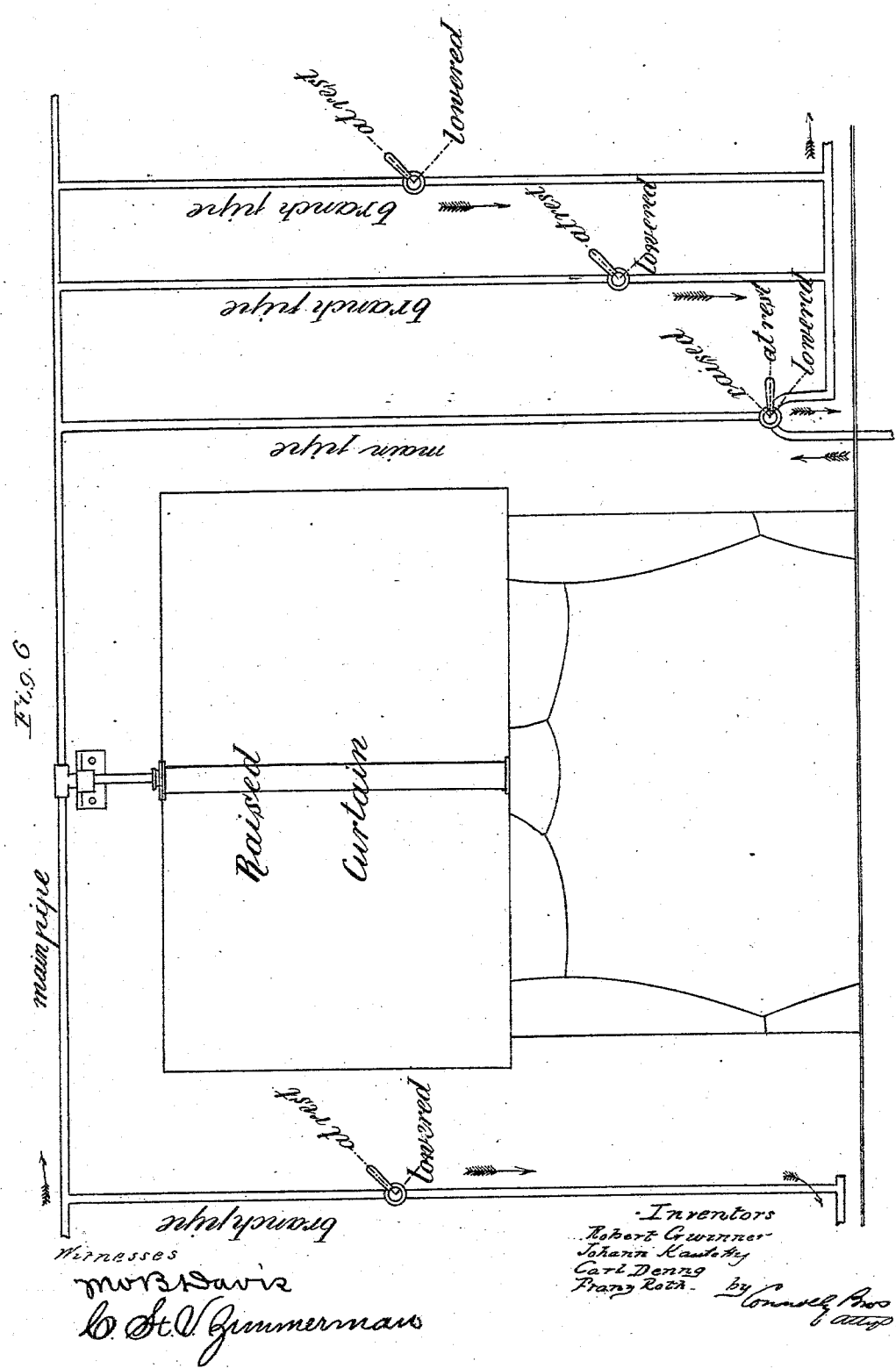

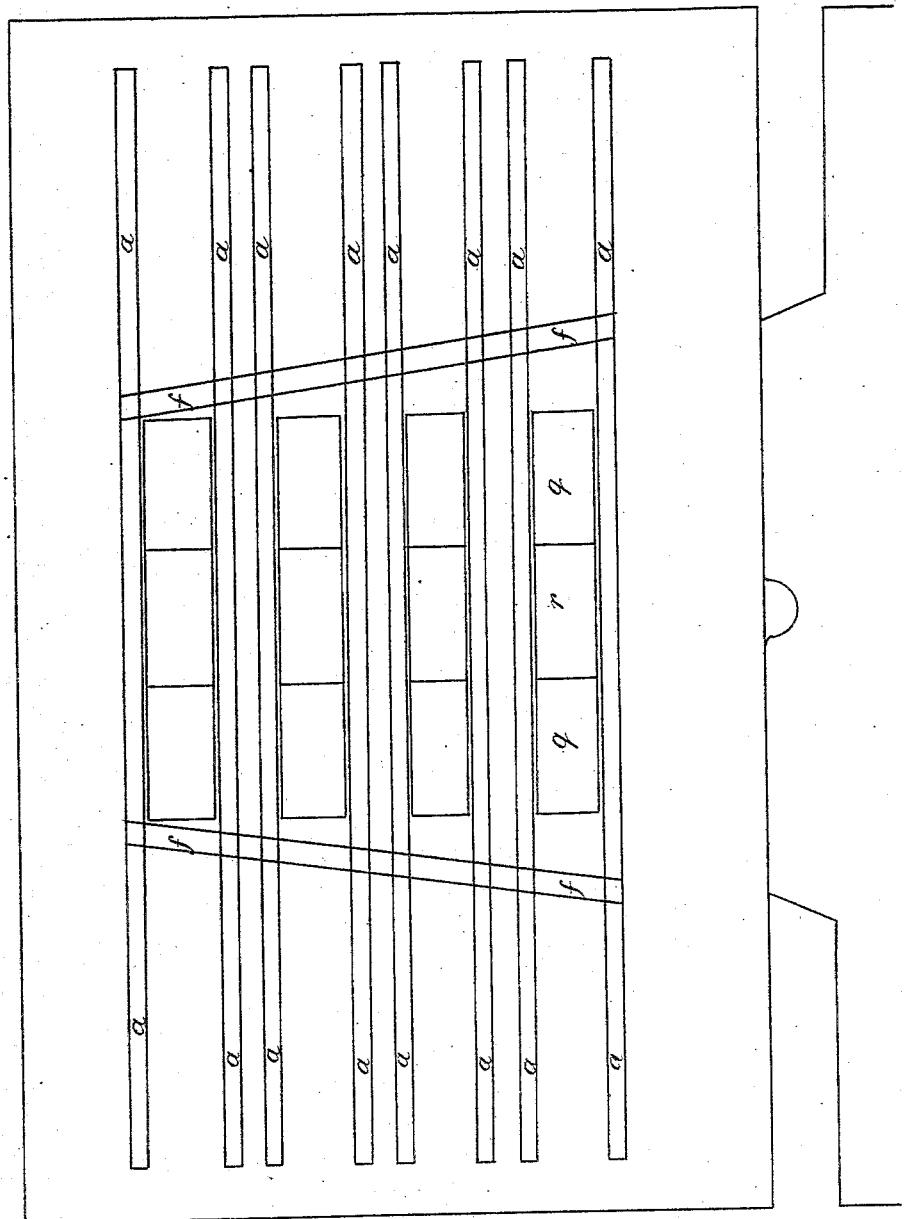

UNITED STATES PATENT OFFICE.

ROBERT GWINNER, JOHANN KAUTSKY, CARL DENGG, AND FRANZ ROTH, VIENNA, AUSTRIA-HUNGARY.

HYDRAULIC THEATER APPLIANCE.

SPECIFICATION forming part of Letters Patent No. 296,286, dated April 1, 1884.

Application filed January 9, 1883. (No model.) Patented in Germany June 6, 1882; in England June 19, 1882, No. 2,889; in France June 24, 1882, No. 149,754; and in Austria-Hungary August 11, 1882, No. 18,384 and No. 31,163.

*To all whom it may concern:*

Be it known that we, ROBERT GWINNER, JOHANN KAUTSKY, CARL DENGG, and FRANZ ROTH, subjects of the Emperor of Austria-Hungary, and residents of Vienna, in the Empire of Austria-Hungary, have invented certain new and useful Improvements in Hydraulic Theater Appliances, of which the following is a specification.

The present invention has for its object facilitating the movements of parts of the stages of theaters; and it consists in combining such parts with hydraulic cylinders.

With reference to the following drawings, Figure 1 is a front view, partly in section, and Fig. 2 a side elevation, of the stage with the moving apparatus. Figs. 3, 4, and 5 are details, hereinafter referred to. Fig. 6 is a rear elevation, and Fig. 7 is a plan view of a stage fitted with our appliances.

The stage-platform is, as usual, divided into sections, of which there are four in the case represented in the drawings. These sections 1, 2, 3, and 4 are separated from each other by transverse flaps $a$, Fig. 2, and each of them is supported by the columns $b$ $b'$, carried by the plungers $B'$ of the hydraulic cylinders $A'$. The columns $b$ $b'$ are connected by means of sockets $c$ with the stage-platform. By this arrangement, in combination with two longitudinal flaps, $f$ $f'$, Fig. 1, in the stage-platform, extending from one end of the stage to the other, each of the said sections may be caused by proper supply of water to the cylinders $A'$ to balance upon an axis parallel to the flaps $f f'$.

The plunger B of a hydraulic cylinder, A, placed between the two above-mentioned cylinders $A'$, carries a main trap-beam, E, the platform of which is divided into three parts, $q$ $r$ $q'$, each of which is supported by a separate hydraulic plunger, $t$ $u$, respectively, the cylinders of which are the plungers $B'$ B $B'$ of the main hydraulic cylinders $A'$ A $A'$, respectively.

Figs. 3 and 4 show in detail the longitudinal sections of the hydraulic cylinders, and in Fig. 5 a plan view of the main trap-beam E is shown.

Each of the parts of the trap-platform has also two separate guides, $w$ $x$, to support the same when stationary. The cross-heads of the plungers $B'$ B $B'$ are supported, when at rest, by the columns $y$ $z$, placed beneath them.

It is clear that when water is properly supplied to the middle main cylinder, A, and the plungers $B'$ B $B'$, after having removed the corresponding part of the stage-floor by any suitable means, the whole trap E is raised, whereas when only the middle plunger, B, is fed with water only the central part, $r$, of the trap is raised, and when the middle plunger, B, is not supplied with water, while the middle cylinder, A, and the side plungers, $B'$ $B'$, are supplied, the parts $q$ $q'$ of the trap are raised and the central part, $r$, remains below.

As either one or more or all of the above-mentioned sections of the stage-platform may be provided with a trap E, substantially as hereinbefore described, and each of the sections may be raised or lowered at pleasure by properly supplying water to the side cylinders, $A'$ $A'$, and as these sections may be even inclined by the combination of the hydraulic cylinders $A'$ $A'$ and the trap mechanism as herein described, any vertical displacement of the stage-ground may be obtained.

It is evident that by charging a large vessel with water under suitable pressure by any convenient power, and providing for suitable tube-connections between this vessel and the hydraulic cylinders $A'$ A $A'$ and their plungers $B'$ B $B'$ in each section, these parts and the parts of the stage-platform connected with them may be operated by stopping or opening corresponding valves or cocks at a central point, either on the stage or somewhere else where the operator may easily find out what changes are necessary. Two other parts of the stage are also moved by hydraulic cylinders—viz., the hanging scene and the fire-curtain. For moving the first, the hydraulic cylinder $A^2$ is arranged and fixed against the wall, Fig. 1, the plunger of which, $B^2$, carries a pulley, $g$, on its cross-head, and slides in guides against the wall. A chain or rope is attached to this cylinder $A^2$, and passed over the pulley $g$, then downward over the pulley $h$, then upward again, being connected at its upper end to a series of ropes passing over the pulleys $i\ k\ l\ m$ on the upper floor or fly-loft of the stage, and connected to a hanging beam, $n$, to which the scene is attached. When water from the large central vessel is permitted to enter the cylinder $A^2$, the plunger $B^2$ is raised, and in consequence thereof the beam $n$ also, whereas when the water contained in $A^2$ is allowed to flow off, the beam $n$ sinks down.

The fire-curtain, which may be of any suitble construction, is actuated by the combination of a hydraulic cylinder, $A^3$, and its hollow piston $B^3$, Fig. 2. The cylinder $A^3$ is fixed to the middle of the fire-curtain, and the piston $B^3$ is fixed to the wall of the stage. The piston-rod is hollow, and its upper end is connected, first, to a pressure-supply, by which the cylinder $A^3$, and with it the fire-curtain, is held in a raised position; and, secondly, to a series of branch escape-pipes leading to various parts of the theater, where they are provided with valves, by opening which the water under pressure escapes, allowing the cylinder $A^3$ and curtain to descend by their own weight. As the cylinder descends, it comes in contact with the lever of a cock, (not shown in the drawings,) which it thus closes to a certain extent, thereby restricting the escape of the water and preventing the curtain from descending too rapidly toward the end.

It is clear that in consequence of the described arrangement of the fire-curtain it can be dropped without any person being near it.

The described arrangements permit one person from one point to operate and to control all the described movements of the stage of a theater.

We claim—

1. In stage apparatus, the combination of a hydraulic cylinder, $A'$, located below the stage-floor, and the plungers $B'$, with parts of the stage, for the purpose of raising or lowering the said parts, the same being supported upon and by said plungers.

2. In stage apparatus, the combination of hydraulic cylinders $A'$ with the sections of the stage-platform, the trap $E$, the hanging scenes, and the fire-curtain, substantially as and for the purpose described.

3. The two longitudinal flaps $f\ f'$ in the stage-platform, for the purpose of creating an opening sufficiently wide to enable a scene to be raised by hydraulic means from beneath the stage-platform, in combination with suitable hydraulic appliances for effecting the elevation of the scene, for the purpose set forth.

4. In hydraulic theater appliances, the combination, with the hydraulic cylinders $A'$, of the plungers $B'$, for moving the stage-platform, and the pistons $t$, for moving the traps, substantially as described.

5. In stage apparatus, the combination of the hydraulic cylinder $A$ with the piston $B'$ and the pulleys $g$, $h$, $i$, $k$, $l$, and $m$, for moving the hanging scenes, substantially as described.

6. In stage apparatus, the combination of a hydraulic cylinder, $A^3$, in the middle of a fire-curtain, a hollow plunger, $B^3$, branch escape-pipes, and a fire-curtain, substantially as and for the purpose set forth.

In testimony whereof we affix our signatures in presence of two witnesses.

ROBERT GWINNER.
JOHANN KAUTSKY.
CARL DENGG.
FRANZ ROTH.

Witnesses:
C. O. PAGET,
F. GOELLER.